US012789184B2

(12) United States Patent
Yamane et al.

(10) Patent No.: US 12,789,184 B2
(45) Date of Patent: Nov. 10, 2026

(54) INSPECTION CARTRIDGE

(71) Applicant: CANON KABUSHIKI KAISHA, Tokyo (JP)

(72) Inventors: Satoshi Yamane, Nasushiobara (JP); Satoru Momosaki, Utsunomiya (JP); Ichiro Tono, Otawara (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 455 days.

(21) Appl. No.: 18/431,136

(22) Filed: Feb. 2, 2024

(65) Prior Publication Data

US 2024/0382952 A1 Nov. 21, 2024

(30) Foreign Application Priority Data

Feb. 2, 2023 (JP) ................................ 2023-014726
Jan. 31, 2024 (JP) ................................ 2024-013095

(51) Int. Cl.
*B01L 3/00* (2006.01)

(52) U.S. Cl.
CPC ..... *B01L 3/502715* (2013.01); *B01L 2200/16* (2013.01)

(58) Field of Classification Search
CPC ......... B01L 3/502715; B01L 3/502723; B01L 2200/16; B01L 2200/027; B01L 2300/0816; B01L 2300/0864; B01L 2300/165; B01L 2400/0406; G01N 33/54366
See application file for complete search history.

(56) References Cited

U.S. PATENT DOCUMENTS

2004/0251171 A1* 12/2004 Iida ...................... G01N 33/491 209/1
2005/0129580 A1* 6/2005 Swinehart ........... B01F 33/3012 422/400
2023/0219093 A1 7/2023 Yamane et al.

FOREIGN PATENT DOCUMENTS

JP 2009-133836 A 6/2009
JP 5424610 B2 2/2014
JP 2023-103043 A 7/2023

* cited by examiner

*Primary Examiner* — Michael L Hobbs
(74) *Attorney, Agent, or Firm* — Oblon, McClelland, Maier & Neustadt, L.L.P.

(57) ABSTRACT

According to one embodiment, an inspection cartridge includes a housing, a first flow path, a second flow path and a reservoir. The housing has an opening for dropping a test solution. The first flow path includes a first detection surface that is a lyophilic and has a substance that binds to the test solution on a surface. The second flow path includes second detection surface that is lyophilic and has a substance that binds to the test solution on a surface, the second flow path being parallel to the first flow path. The reservoir is formed below the opening and connected to the first flow path and the second flow path, the reservoir being liquid-phobic.

12 Claims, 13 Drawing Sheets

INSPECTION CARTRIDGE

CROSS-REFERENCE TO RELATED APPLICATION

This application is based upon and claims the benefit of priority from Japanese Patent Applications No. 2023-014726, filed Feb. 2, 2023, and No. 2024-013095, Jan. 31, 2024, the entire contents of all of which are incorporated herein by reference.

FIELD

Embodiments disclosed herein relate generally to an inspection cartridge.

BACKGROUND

In infectious disease inspections, blood inspections, and the like, it is necessary to collect samples such as mucosal epithelium and blood, and it is desired to perform the minimum necessary for invasive medical practice. Further, in an inspection for a newborn infant, there are many cases where only a trace amount of sample can be collected, and an inspection using a trace amount of sample is required. As described above, in an inspection item that requires invasive sample collection or an inspection item that can obtain only a trace amount of sample, it is necessary to perform an inspection with a trace amount of sample. However, in an inspection using a trace amount of sample, it is difficult to feed a trace amount of sample to a reaction detection area due to surface tension of liquid.

Therefore, a solution is also conceivable in which a large opening is provided immediately above or in the vicinity of the reaction detection area to feed a trace amount of sample without being affected by surface tension. However, in a case where an optical detection method is used as a method for detecting a sample, there is a problem that the method is easily affected by external light incident on a reaction tank from the opening.

DETAILED DESCRIPTION

Figure 1:
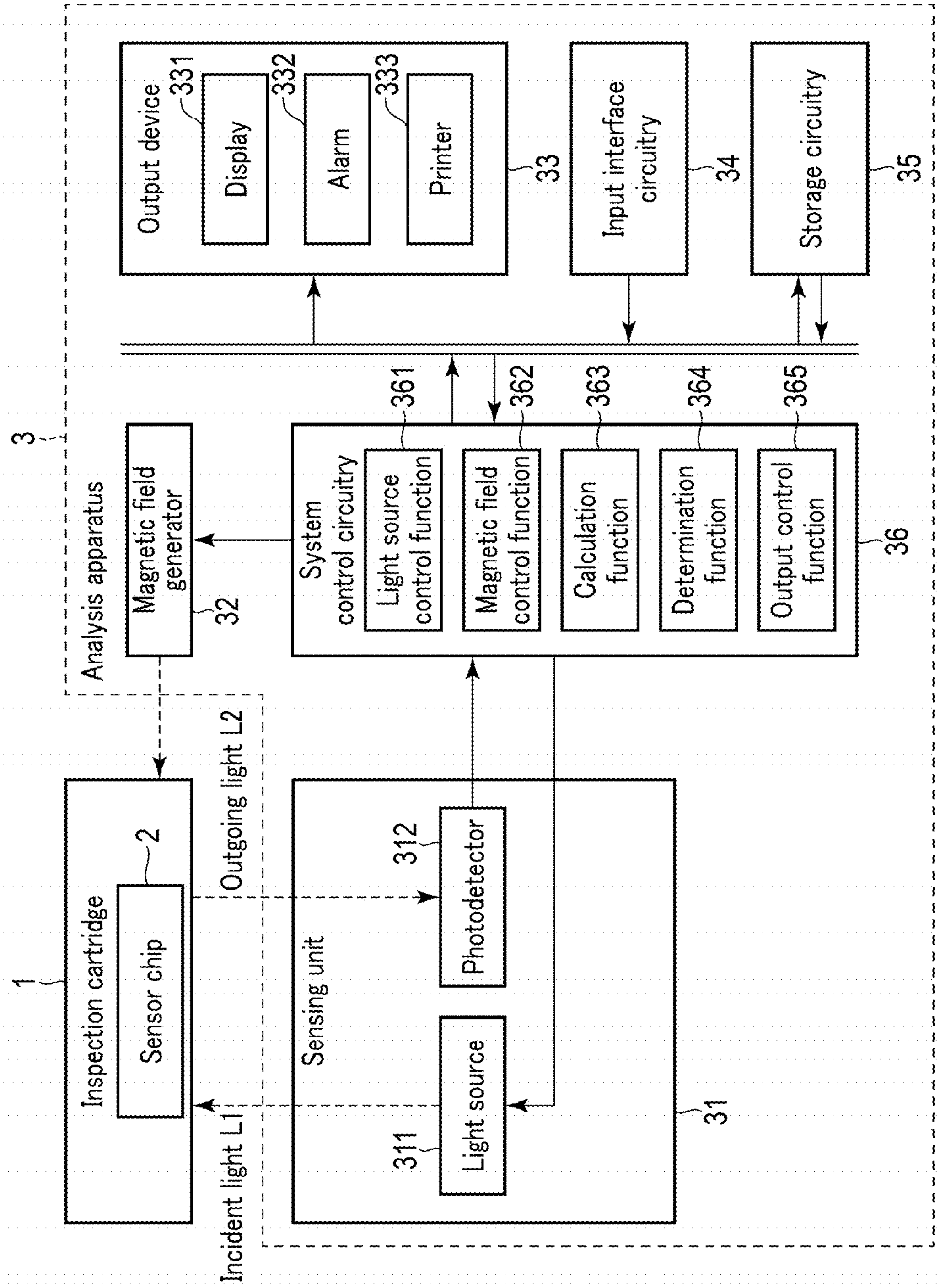
FIG. 1 is a block diagram illustrating an inspection system according to the present embodiment.

In general, according to one embodiment, an inspection cartridge includes a housing, a first flow path, a second flow path and a reservoir. The housing has an opening for dropping a test solution. The first flow path includes a first detection surface that is a lyophilic and has a substance that binds to the test solution on a surface. The second flow path includes second detection surface that is lyophilic and has a substance that binds to the test solution on a surface, the second flow path being parallel to the first flow path. The reservoir is formed below the opening and connected to the first flow path and the second flow path, the reservoir being liquid-phobic.

According to one embodiment, an inspection cartridge includes a housing, a first detection surface, a second detection surface and a non-detection surface. The housing has an opening for dropping a test solution and one or more air ports. The first detection surface is located in the housing and having a substance that binds to the test solution on a surface of the first detection surface. The second detection surface is located inside the housing and having the substance on a surface of the second detection surface, the second detection surface being parallel to the first detection surface. The non-detection surface is formed between the first detection surface and the second detection surface. An air gap is provided above the first detection surface, the second detection surface, and the non-detection surface.

Hereinafter, an inspection cartridge according to the present embodiment will be described with reference to the drawings. In the following embodiment, portions denoted by the same reference numerals perform similar operations, and redundant description will be omitted as appropriate.

First Embodiment

An inspection system according to the present embodiment will be described with reference to a block diagram of FIG. 1.

The inspection system includes an inspection device 1 (hereinafter, referred to as an inspection cartridge 1) and an analysis apparatus 3. It is detachable from the analysis apparatus 3.

Here, a plurality of first antibodies is immobilized on an upper surface of an optical waveguide (not illustrated) located at a lower portion of the inspection cartridge 1. The first antibody is a substance that specifically reacts with an antigen contained in the detection target substance by an antigen-antibody reaction.

In addition, it is assumed that a liquid to be dropped into the inspection cartridge 1 is a mixed liquid (hereinafter, referred to as a test solution) of a sample solution and a reagent. The sample solution includes a detection target substance containing an antigen. The reagent includes a reagent component. The reagent component includes, for example, a second antibody that specifically reacts with the antigen by the antigen-antibody reaction, and magnetic particles on which the second antibody is immobilized. At least a part of the magnetic particles is formed of a magnetic material such as magnetite. In the magnetic particles, for example, surfaces of particles formed of a magnetic material are coated with a polymer material. Note that the magnetic particles may be configured to cover the surfaces of the particles made of a polymer material with a magnetic material. In addition, any magnetic particles may be substituted as long as they can be dispersed in the test solution.

The reagent component moves so as to be dispersible in the test solution filled in a reaction tank of the inspection cartridge 1. Therefore, the magnetic particles are selected so that the gravity applied to the magnetic particles is larger than the buoyancy in the test solution applied in a direction opposite to the gravity. The magnetic particle on which the second antibody is immobilized is immobilized near an upper surface of the optical waveguide by the second antibody being bound to the first antibody through the antigen. The second antibody may be the same as or different from the first antibody.

An analysis apparatus 3 includes a sensing unit 31, a magnetic field generator 32, an output device 33, an input interface circuitry 34, a storage circuitry 35, and a system control circuitry 36.

The sensing unit 31 includes a light source 311 and a photodetector 312.

The light source 311 is a diode such as a light emitting diode (LED) or a lamp such as a xenon lamp. The light source 311 is disposed at a position where light can enter the optical waveguide toward a grating (not illustrated) on an incident side of the inspection cartridge 1. The light source 311 causes an incident light L1 to enter the optical waveguide through a transparent substrate of the inspection cartridge 1. The incident light L1 enters the optical waveguide and is diffracted by the grating on the incident side. The incident light L1 diffracted by the grating on the incident side propagates in the optical waveguide while being totally reflected, and reaches a grating (not illustrated) on the emission side. The light reaching the grating on the emission side is diffracted by the grating on the emission side, and is emitted from the optical waveguide to the outside at a predetermined angle as an outgoing light L2. Instead of the light source 311, an electromagnetic wave or the like other than light may be generated.

The photodetector 312 outputs an electric signal based on a reaction state in the reaction tank in which the test solution is accommodated. Specifically, the photodetector 312 detects the outgoing light L2 emitted to the outside of the optical waveguide, and generates an electric signal indicating an intensity of the detected outgoing light L2, that is, digital data regarding the photodetection intensity. The digital data related to the light detection intensity generated by the photodetector 312 is supplied to the system control circuitry 36.

The magnetic field generator 32 applies a magnetic field to the reaction tank of the inspection cartridge 1 according to a control of the system control circuitry 36, thereby accelerating the sedimentation of the magnetic particles in the reaction tank or pulling the magnetic particles upward. The magnetic field generator 32 generates energy for promoting binding between the second antibody immobilized on the magnetic particle and the first antibody immobilized on the upper surface of the optical waveguide through the antigen. Specifically, the magnetic field generator 32 has an upper magnetic field generator and a lower magnetic field generator. Furthermore, the magnetic field generator 32 includes a drive circuitry (not illustrated). Each of the upper magnetic field generator and the lower magnetic field generator is made of, for example, a permanent magnet and an electromagnet.

The output device 33 includes a display 331, an alarm 332, and a printer 333.

The display 331 outputs data to a general external display device such as a liquid crystal display or an organic LED (OLED) display. Under the control of the system control circuitry 36, the display 331 displays various operation screens, information indicating the light intensity of the outgoing light L2 supplied from the photodetector 312, time-series data of the information indicating the light intensity, measurement results of the detection target substance, and the like. The measurement result is, for example, a numerical value corresponding to the concentration, weight, or number of antigens, that is, the amount of antigens.

The alarm 332 is, for example, a speaker. The alarm 332 reports operation timing, an alarm, and the like to the operator under the control of the system control circuitry 36.

Under the control of the system control circuitry 36, the printer 333 prints, for example, various operation screens output from the display 331, information indicating the light intensity of the outgoing light L2 supplied from the photodetector 312, data of information indicating the light intensity, a measurement result of the detection target substance, and the like.

The input interface circuitry 34 is realized by, for example, a trackball, a switch button, a mouse, a keyboard, a touch pad that performs an input operation by touching an operation surface, and a touch panel display in which a display screen and the touch pad are integrated. The input interface circuitry 34 outputs an operation input signal corresponding to an operator's operation to the system control circuitry 36. In the present embodiment, the input interface circuitry 34 is not limited to one including physical operation components such as a mouse and a keyboard. For example, an electric signal processing circuitry that receives an electric signal corresponding to an input operation from an external input device provided separately from the device and outputs the electric signal to the system control circuitry 36 is also included in the example of the input interface circuitry 34.

The storage circuitry 35 includes a recording medium readable by a processor, such as a magnetic or optical recording medium or a semiconductor memory. The storage circuitry 35 stores a program executed by the circuitry of the analysis apparatus 3 according to the present embodiment. Note that some or all of the programs and data in the storage medium of the storage circuitry 35 may be configured to be downloaded through an electronic network.

The storage circuitry 35 stores information indicating the light intensity of the outgoing light L2 supplied from the photodetector 312, time-series data of the information indicating the light intensity, a measurement result of the detection target substance to be measured, and the like.

The storage circuitry 35 is, for example, a storage medium such as a hard disk drive (HDD) or a solid state drive (SSD), and stores setting information for measuring a detection target substance. The setting information includes, for example, information defining a timing of executing predetermined processing necessary for measurement. The timing at which the predetermined processing necessary for the measurement is executed is, for example, a timing at which the application of a lower magnetic field is started, a timing at which the application of the lower magnetic field is stopped, a timing at which the application of an upper magnetic field is started, and a timing at which the determination is performed. The information defining these timings includes a relative elapsed time from a predetermined time or an absolute time at which predetermined processing is executed. Note that a relative elapsed time from the predetermined time or an absolute time at which the predetermined processing is executed may be empirically or experimentally determined and set in advance.

The storage circuitry 35 stores a preset threshold TA. A threshold TA is a threshold for light intensity corresponding to the concentration of the detection target substance. The threshold TA is used to determine a qualitative state of the detection target substance. The qualitative state is, for example, the degree of positive or negative indicated by the measurement result. The threshold TA is used to make a final determination as to whether or not the measurement result of the detection target substance is highly likely to be positive. Note that the threshold TA may be a plurality of stepwise thresholds. That is, the light intensity included in the digital data is compared with a plurality of stepwise thresholds, thereby being capable of performing determination indicating a more detailed measurement result.

The system control circuitry 36 is, for example, a processor that controls each component circuitry of the analysis apparatus 3. The system control circuitry 36 functions as a center of the analysis apparatus 3. The system control circuitry 36 calls each operation program from the storage circuitry 35 and executes the called program to implement a light source control function 361, a magnetic field control function 362, a calculation function 363, a determination function 364, and an output control function 365.

The light source control function 361 controls the light source 311 to generate light under a predetermined condition. In the light source control function 361, the system control circuitry 36 continuously or intermittently generates the incident light L1 from the light source 311 at least from the start of measurement to the end of measurement.

The magnetic field control function 362 controls the magnetic field generator 32 according to a time schedule stored in advance in the storage circuitry 35, and switches an application state of energy that promotes a reaction in the reaction tank. Specifically, in the magnetic field control function 362, the system control circuitry 36 reads the setting information from the storage circuitry 35, controls the magnetic field generator 32 based on the read setting information, and causes the magnetic field generator 32 to generate a magnetic field.

The calculation function 363 performs various calculations based on the time-series digital data of the light intensity supplied from the photodetector 312. In the calculation function 363, the system control circuitry 36 uses the supplied time-series digital data of the light intensity to perform calculation regarding optical changes such as an average value of the light intensity, a variation rate of the light intensity, and an integrated value of the variation rate.

The determination function 364 generates a measurement result related to the amount of the detection target substance based on digital data of the light intensity supplied from the photodetector 312 during the application of the upper magnetic field described later. Specifically, the determination function 364 determines the quantity (amount of substance, concentration, etc.) of the detection target substance in a qualitative state such as "highly likely to be positive" based on digital data of light intensity. In the determination function 364, the system control circuitry 36 reads the setting information and the threshold TA from the storage circuitry 35. The system control circuitry 36 determines the qualitative state of the detection target substance in accordance with execution timing included in the read setting information. In a case where the light intensity included in the supplied time-series digital data of the light intensity is equal to or less than the threshold TA, the system control circuitry 36 determines that, for example, the measurement result of the detection target substance has a high possibility of being positive. In the case where the light intensity included in the digital data is larger than the threshold TA, for example, the system control circuitry 36 determines that there is a high possibility that the measurement result of the detection target substance is weak positive or negative.

The output control function 365 controls the output device 33 and outputs a determination result such as a qualitative state of the detection target substance to the operator. In the output control function 365, the system control circuitry 36 controls the display 331 or the printer 333 to present the determination result to the operator. The presentation includes display through a display and a method of printing using a printer. The system control circuitry 36 controls the alarm 332 to report the determination result to the operator. The announcement includes a method of notifying by sound or the like.

Figure 2:
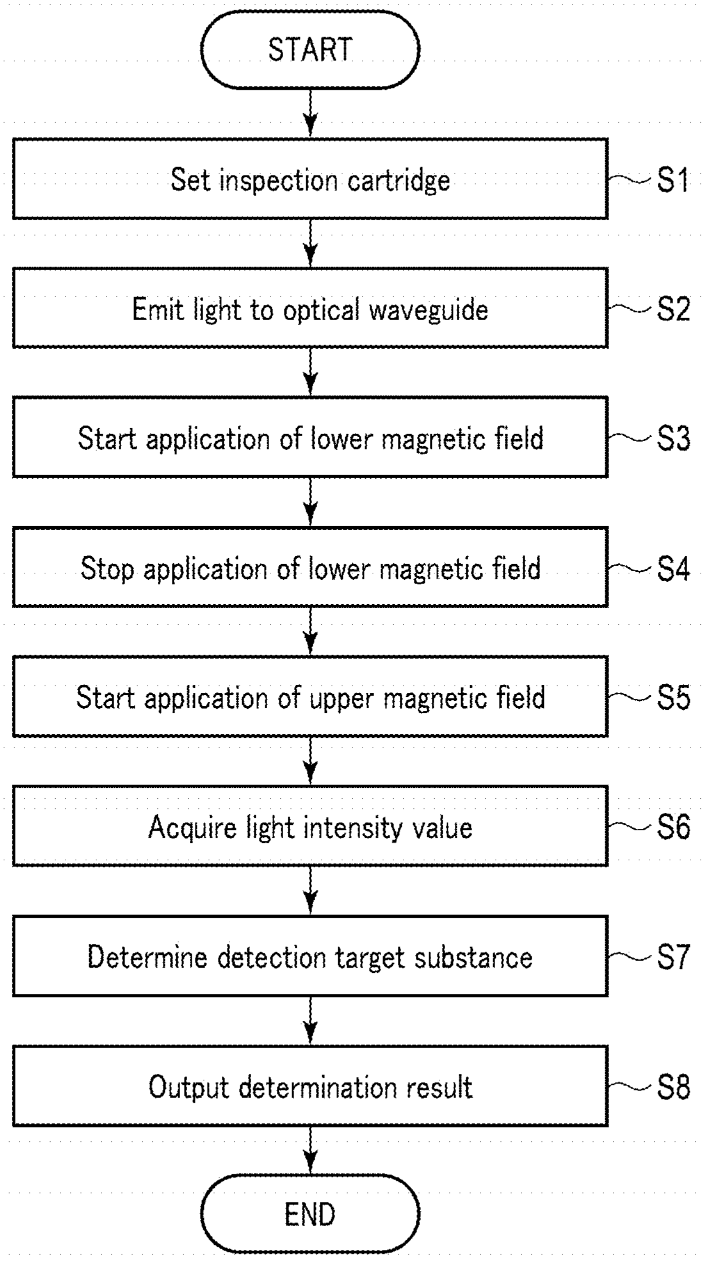
FIG. 2 is a flowchart illustrating an example of a sample test by the inspection system according to the present embodiment.

Next, an example of sample test by the inspection system according to the present embodiment will be described with reference to a flowchart of FIG. 2.

In step S1, the inspection cartridge 1 is set in the analysis apparatus 3, and the test solution is dropped. As a result, the reaction tank of the inspection cartridge 1 is filled with the test solution. A lower magnetic field may be applied by the magnetic field generator 32 at a timing when the test solution is dropped into an opening 10 of the inspection cartridge 1. Alternatively, the magnetic field may be shaken by alternately or randomly and intermittently applying the upper magnetic field and the lower magnetic field by the magnetic field generator 32. With application of the magnetic field in this manner, it is possible to promote the drop of the droplet into the reaction tank and to shorten the time until the filling of the test solution.

In step S2, light with a constant intensity is emitted from the light source 311 of the sensing unit 31 toward the optical waveguide of the inspection cartridge 1, so that light with a constant intensity enters the optical waveguide. Note that light of the constant intensity is continuously incident from the light source 311.

The magnetic field generator 32 starts applying the lower magnetic field. The light incident on the optical waveguide propagates while being totally reflected in the optical waveguide, and is emitted to the photodetector 312 through a transparent substrate.

When light propagates in the optical waveguide, near-field light (evanescent light) is generated at a top surface of the optical waveguide. An area near the surface of the optical waveguide where near-field light can be generated in the reaction tank is also referred to as a sensing area. In the reaction tank, the first antibody immobilized on the upper surface of the optical waveguide reacts with the antigen contained in the detection target substance in the sample solution. When the first antibody and the antigen react with each other, the second antibody immobilized on the magnetic particles contained in the reagent component also binds to the reacted first antibody. As a result, the magnetic particles on which the second antibody is immobilized are held in the vicinity of the reaction detection area on the upper surface of the optical waveguide.

The light guided through the optical waveguide is scattered and absorbed by magnetic particles fixed in the vicinity of the upper surface of the optical waveguide. As a result, the light guided through the optical waveguide is attenuated and emitted from the optical waveguide. That is, the incident light L1 is attenuated according to the amount of antigen binding the first antibody and the second antibody immobilized on the magnetic particles, in other words, the amount of antigen accommodated in the reaction tank.

The photodetector 312 receives light emitted from the optical waveguide, and supplies data of light intensity to the system control circuitry 36 at predetermined time intervals.

In step S3, the magnetic field generator 32 starts application of the lower magnetic field under the control of the system control circuitry 36. Specifically, a lower magnetic field generator disposed below the inspection cartridge 1 applies a vertically downward magnetic force to the magnetic particles in the reaction tank to generate a lower magnetic field in order to accelerate sedimentation. According to the generated vertically downward magnetic field and gravity, the magnetic particles on which the second antibody is immobilized are aligned along the lines of magnetic force and descend under the force in the vertical direction. The second antibody binds to the first antibody immobilized on the reaction detection area located on a lower surface of the reaction tank through the light source.

In step S4, the magnetic field generator 32 stops the application of the lower magnetic field at a predetermined timing under the control of the system control circuitry 36.

In step S5, the magnetic field generator 32 starts application of the upper magnetic field under the control of the system control circuitry 36. Specifically, the upper magnetic field generator is positioned above the inspection cartridge 1 in the case where the inspection cartridge 1 is set in the analysis apparatus 3. The upper magnetic field generator generates an upper magnetic field to pull up the magnetic particles vertically upward in the reaction tank. Due to this vertically upward magnetic field, the magnetic particles modified with the second antibody that has not bound to the first antibody through the antigen rise under the force in the vertically upward direction. At this time, the upper magnetic field generator selectively moves unreacted magnetic particles away from the sensing area by generating a magnetic field having a predetermined strength. That is, the upper magnetic field generator adjusts the strength of the magnetic field to be generated, thereby making it possible to keep only the magnetic particles modified with the second antibody bound to the first antibody through the antigen, fixed to the upper surface of the optical waveguide, in the sensing area.

In step S6, at the timing when the reaction in the reaction tank is considered to have converged, the system control circuitry 36 acquires one value of light intensity data continuously supplied from the photodetector 312 as a measured value.

In step S7, the system control circuitry 36 compares the measured value acquired in step S7 with the threshold TA stored in the storage circuitry 35 by the determination function 364 to determine, for example, positive or negative.

In step S8, the system control circuitry 36 presents or notifies the user of the determination result by the output control function 365.

Next, an example of the time-series change in the light intensity of the emitted light will be described with reference to FIG. 3.

Figure 3:
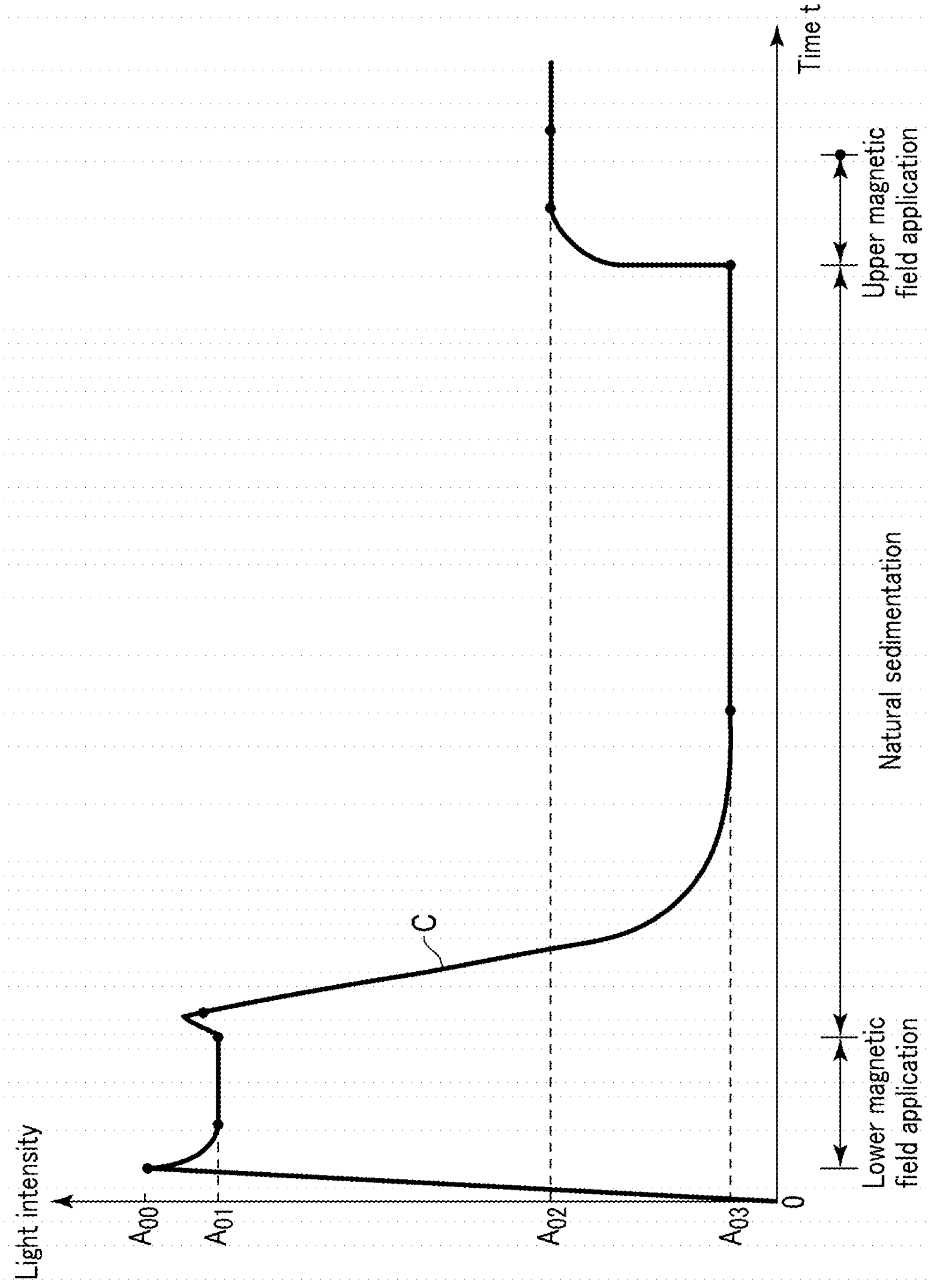
FIG. 3 is a diagram illustrating an example of time-series change in light intensity of emitted light according to the present embodiment.

FIG. 3 is a graph C of a time-series change in light intensity, in which a vertical axis indicates light intensity and a horizontal axis indicates time.

When the test solution is dropped into the reaction tank of the inspection cartridge 1 and the reaction tank is filled with the test solution, the measured light intensity increases. This is because a water-soluble film applied to the upper surface of the optical waveguide including the reaction detection area to prevent denaturation of the first antibody is dissolved.

Thereafter, when the lower magnetic field is applied, as described above, the magnetic particles to which the second antibody in the test solution of the reaction tank is immobilized bind to the first antibody immobilized on the reaction detection area through the antigen. In addition, since the magnetic particles on which the second antibody is immobilized sequentially enter the sensing area, the amount of scattering/absorber in the sensing area increases and the light intensity decreases. A rate of decrease of the light intensity decreases over time and reaches equilibrium at a certain light intensity value, here A01. At this time, a plurality of magnetic particles is connected in a chain shape to form a cluster. At this time, the number of magnetic particles in the sensing area is apparently small.

Thereafter, when the application of the lower magnetic field is stopped, the magnetic particles on which the second antibody is immobilized are released from the lower magnetic field, so that the clusters are dispersed by Brownian motion to start natural sedimentation. In a predetermined period after the application of the lower magnetic field is stopped, so-called overshoot occurs, and the light intensity turns to increase and then turns to decrease in a short period. Once the overshoot converges, the light intensity then decreases. This is because the magnetic particles on which the second antibody is immobilized sequentially enter the sensing area, so that the amount of scattering/absorber increases and the reduction rate increases. After a certain period of time, the natural sedimentation of the magnetic particles on which the second antibody is immobilized also converges, and converges to a certain light intensity value, here, a light intensity value A03.

In a state where the light intensity converges to the light intensity value A03, the magnetic particle on which the second antibody is immobilized remains in the sensing area. When near-field light is generated on the upper surface of the optical waveguide with the magnetic particles remaining in the sensing area, the magnetic particles remaining in the sensing area scatter and absorb the near-field light, and attenuate the near-field light. That is, with attenuation of the near-field light in the sensing area, the light guided in the optical waveguide is also attenuated. In other words, as the amount of magnetic particles remaining in the sensing area increases, the intensity of light output from the optical waveguide decreases.

In the absence of the magnetic field, the magnetic particles remaining in the sensing area are not limited to those in which the first antibody immobilized on the upper surface of the optical waveguide through the antigen to be measured and the second antibody immobilized on the magnetic particles are bound. That is, unreacted magnetic particles may also remain in the sensing area. Therefore, in order to measure the accurate concentration of the antigen contained in the detection target substance, it is necessary to keep the magnetic particles not involved in the measurement, that is, having the second antibody that is not bound to the antigen immobilized thereon, away from the sensing area. Therefore, with application of the upper magnetic field, the unreacted magnetic particles are moved away upward from the sensing area and floated again in the reaction tank.

As a result, most of the magnetic particles that finally remain in the sensing area are a combination of the first antibody and the second antibody immobilized on the upper surface of the optical waveguide through the antigen, and reach an equilibrium state at a certain light intensity value, here, the light intensity value A02. A determination result is obtained by comparing the light intensity value A02 with the threshold TA.

Figure 4:
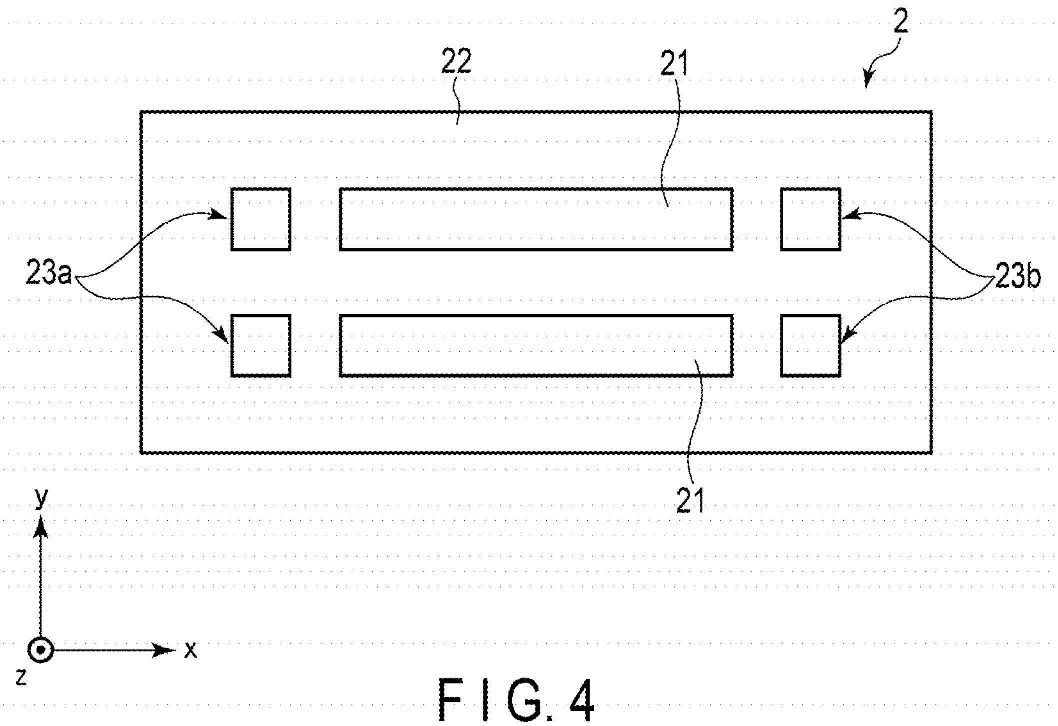
FIG. 4 is a diagram illustrating a design example of a sensor chip according to a first embodiment.

Next, a design example of the sensor chip 2 will be described with reference to FIG. 4. FIG. 4 is a diagram of the sensor chip 2 as viewed from an upper surface side.

The sensor chip 2 includes reaction detection surfaces 21, a non-reaction detection surface 22, gratings 23*a*, and gratings 23*b*. The reaction detection surfaces 21 are located at the center of the sensor chip 2 and are areas where the antibody is fixed (applied) to the upper surface of the sensor chip 2 (the upper surface of the optical waveguide). Here, as two independent areas, the reaction detection surfaces 21 are formed so as to be parallel in two rows. In addition, the reaction detection surface 21 has a substance that binds to the detection target substance on the surface. In addition, a surface of the reaction detection surface. 21 is treated so as to have lyophilic property. The lyophilic property refers to a property that a contact angle with respect to a liquid is smaller than about 90 degrees, and in the case where the liquid is water, the lyophilic property is also referred to as hydrophilicity. For example, the reaction detection surface may be coated with a film having lyophilic property. As a material of the coating, for example, a water-soluble polymer (polysaccharides, cellulose derivatives, polyvinyl alcohol, polyacrylic acid, protein, and the like) or one or a mixture of derivatives thereof may be used. Alternatively, a water-soluble small molecule (saccharides, disaccharides, polyhydric alcohols) or one or a mixture of derivatives thereof may be used. Furthermore, the coating material may contain a polymer and a low molecular weight.

The non-reaction detection surface 22 is a portion other than the reaction detection surface 21 on the upper surface of the sensor chip 2. Specifically, the non-reaction detection surface 22 is an area surrounding the periphery of the reaction detection surface 21 for each row such that each of the reaction detection surfaces 21 is an independent area. The non-reaction detection surface 22 is formed to have liquid-repellency (liquid-repellency). The liquid repellency refers to a property that a contact angle with respect to a liquid is larger than approximately 90 degrees, and in a case where the liquid is water, the liquid repellency is also referred to as hydrophobicity (water repellency). Examples of the material having liquid-repellency include acryl, epoxy, polyvinyl chloride, and acryl. For example, the non-reaction detection surface 22 may be coated with these materials having liquid-repellency.

Since the liquid is repelled in the area of the non-reaction detection surface 22, the non-reaction detection surface 22 serves to retain the test solution on the reaction detection surface 21 having lyophilic property.

The gratings 23*a* have a structure that reflects (diffracts) light, and are disposed at positions where light is incident on the optical waveguide.

The gratings 23*b* have a structure that reflects (diffracts) light, and are disposed at positions that reflect light in the optical waveguide to the outside.

Next, a configuration example of the inspection cartridge 1 according to the first embodiment will be described with reference to FIGS. 5 to 8.

Figure 5:
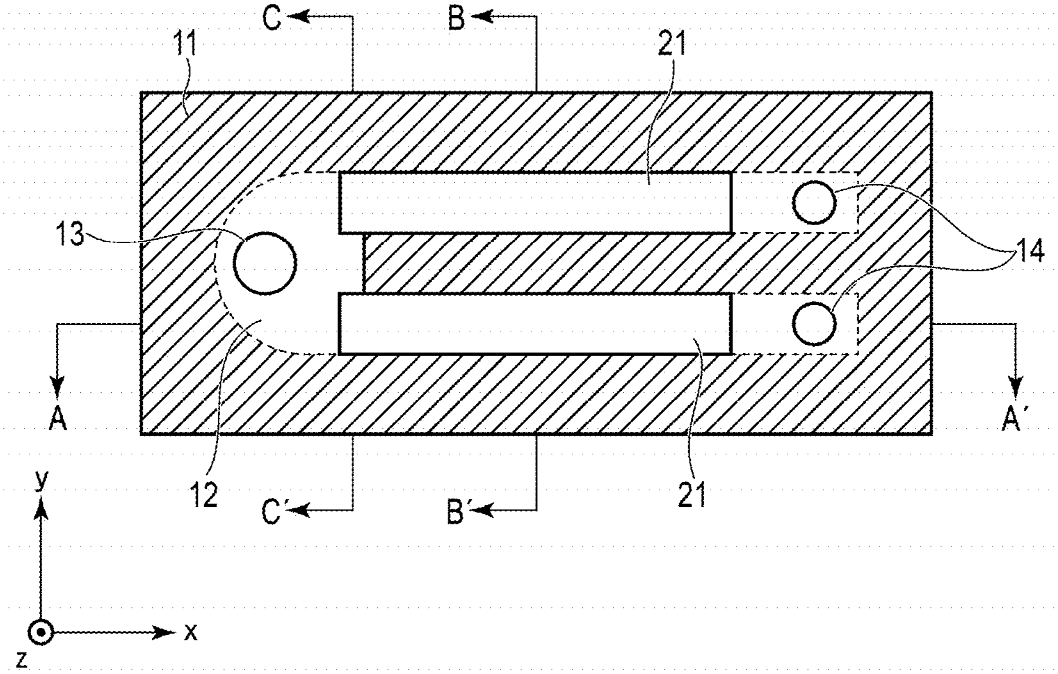
FIG. 5 is a diagram illustrating a configuration example of an inspection cartridge according to the first embodiment.

FIG. 5 is a diagram of a cross section of the reaction tank portion of the inspection cartridge 1 as viewed from the z-axis direction. The housing 11 of the inspection cartridge 1 seen from the top is illustrated by hatching.

The housing 11 is made of, for example, polyvinyl chloride and has liquid-repellency. A drip opening 13 for dropping the test solution into the reaction tank is formed in an upper portion of the housing 11. The drip opening 13 is located on an end side in the longitudinal direction of the reaction detection surface 21, and a reservoir 12 for storing the dropped test solution is formed below the drip opening 13. The reservoir 12 is formed by the non-reaction detection surface 22 of the sensor chip 2 and the housing 11, and thus has liquid-repellency. The reservoir 12 is connected to each end of the two reaction detection surfaces 21. In addition, on the end side of the reaction detection surface 21 facing the drip opening 13, vents 14 for removing air pushed out as the reaction tank 15 is filled with the test solution are formed. For convenience of description, each of the drip opening 13 and the vents 14 is an opening provided in the housing 11, but is illustrated in the reservoir 12 and the non-reaction detection surface 22 in order to illustrate the opening position.

As shown in FIG. 5, since the two reaction detection surfaces 21 are symmetrically arranged with respect to the drip opening 13, the test solution dropped from the drip opening 13 to the reservoir 12 is delivered in substantially the same amount with respect to the two reaction detection surfaces 21. Therefore, even when the amount of the test solution is very small (1 to 2 drops by the dropping device), the test solution can be uniformly delivered to the reaction detection surface 21.

Figure 6:
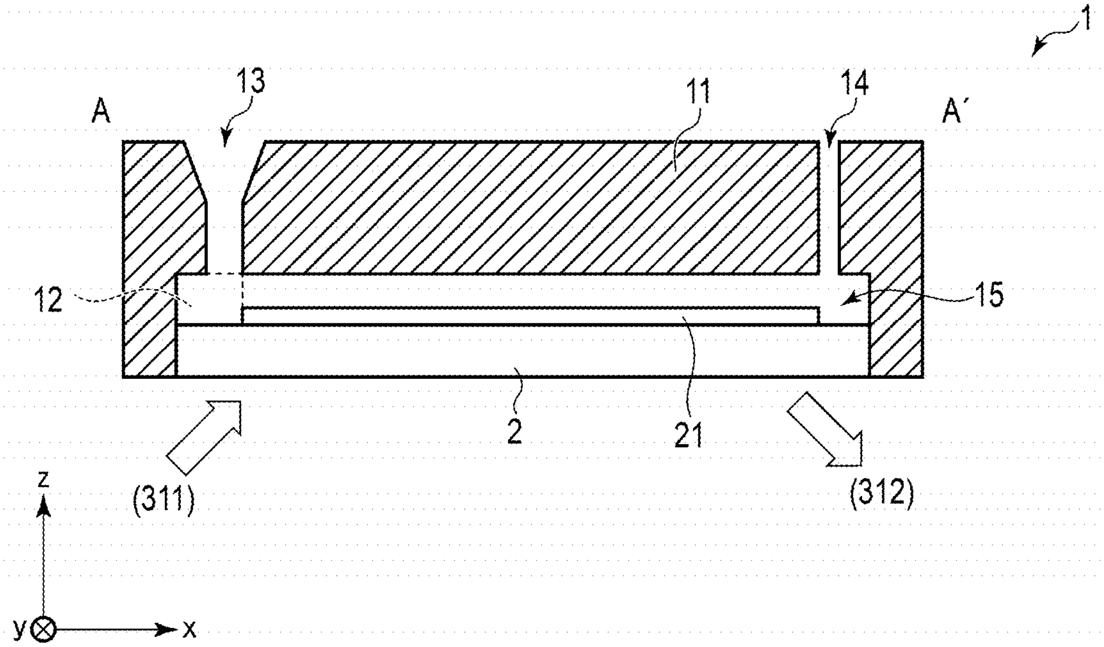
FIG. 6 is a cross-sectional view illustrating a configuration example of the inspection cartridge according to the first embodiment.

FIG. 6 is a cross-sectional view of the inspection cartridge 1 taken along line A-A' of FIG. 5.

The inspection cartridge 1 has a configuration in which the sensor chip 2 is attached to a bottom surface of the housing 11. A space is formed between the sensor chip 2 and an upper portion of the housing 11 facing the sensor chip 2, and the space serves as the reaction tank 15. In addition, the drip opening 13 formed in the upper portion of the housing 11 has a tapered shape that narrows from the upper surface of the housing 11 toward the reaction tank 15. A size of the drip opening 13 is assumed to be a size at which the test solution is smoothly fed to the reaction tank 15, and may be, for example, a diameter larger than that of the vent 14.

The reservoir 12 is formed below the drip opening 13. In the example of FIG. 6, a bottom surface portion of the reservoir 12 is parallel to the reaction detection surface 21, but the bottom surface portion of the reservoir 12 may be inclined so that the test solution easily spreads from the reservoir 12 to the reaction detection surface 21.

Although not illustrated here, the sensor chip 2 includes a transparent substrate and an optical waveguide. The transparent substrate is made of resin, optical glass, or the like, and allows light incident from the light source 311 to pass through the optical waveguide. The transparent substrate allows light having passed through the optical waveguide to pass to the outside. Note that the transparent substrate is made of a material having a refractive index different from that of the optical waveguide, and totally reflects light at a boundary surface with the optical waveguide. That is, the transparent substrate serves as a cladding that confines light in the optical waveguide. The transparent substrate also serves to physically protect the optical waveguide.

The optical waveguide is laminated on the transparent substrate, and light passes through the optical waveguide. That is, the optical waveguide plays a role similar to that of the core (core material) in the optical fiber. A material that transmits light is made of, for example, resin or optical glass. As the resin, for example, a phenol resin, an epoxy resin, or an acrylic resin can be used. The reaction detection surfaces 21 are formed on the upper surface of the optical waveguide.

Figure 7:
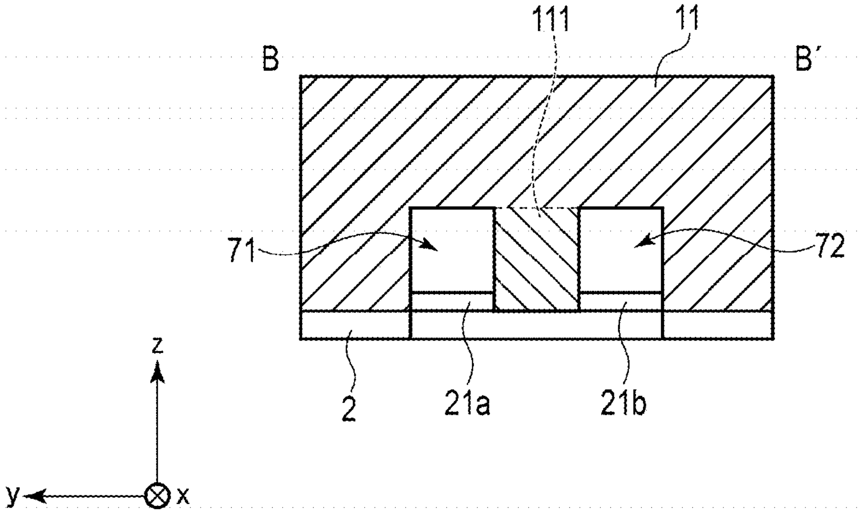
FIG. 7 is a cross-sectional view illustrating a configuration example of an inspection cartridge according to the first embodiment.

Next, FIG. 7 is a cross-sectional view of the inspection cartridge 1 taken along line B-B' in FIG. 5.

A liquid-phobic isolation wall 111 is formed between the reaction detection surface 21*a* and the reaction detection surface 21*b*. The isolation wall 111 is, for example, a part of the housing 11, and is assumed to be integrally molded with the housing 11, but may be formed of a part made of another material having liquid-repellency. As illustrated in FIG. 7, a first flow path 71 in which the test solution wets and spreads on the reaction detection surface 21*a* is formed by the housing 11, the isolation wall 111, and the reaction detection surface 21*a*. Similarly, a second flow path 72 is formed by the housing 11, the isolation wall 111, and the reaction detection surface 21*b*.

Figure 8:
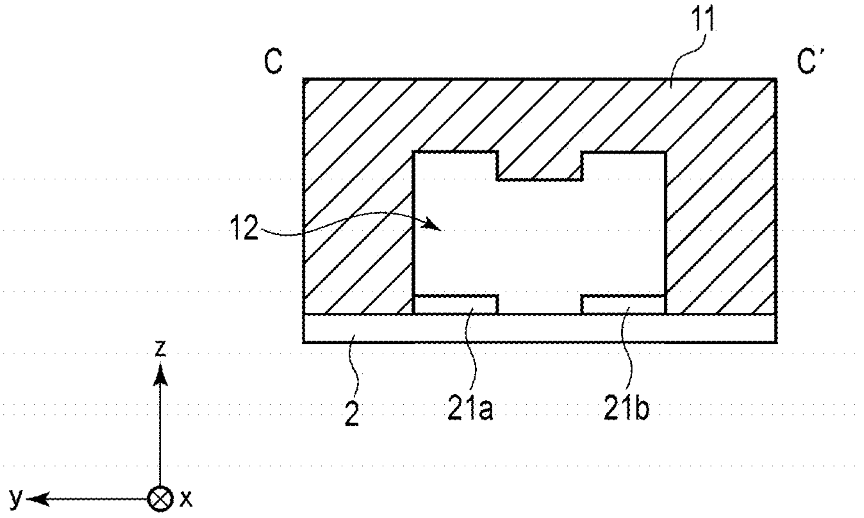
FIG. 8 is a cross-sectional view illustrating a configuration example of an inspection cartridge according to the first embodiment.

Next, FIG. 8 is a cross-sectional view of the inspection cartridge 1 taken along line C-C' in FIG. 5. In other words, FIG. 8 is a cross-sectional view of the reservoir 12, and the reservoir 12 is connected to the ends of the reaction detection surface 21*a* and the reaction detection surface 21*b*. Since the first flow path 71 and the second flow path 72 are arranged symmetrically with respect to the reservoir 12, the substantially same amount of the test solution dropped from the drip opening 13 is delivered to the first flow path 71 and the second flow path 72 by the isolation wall 111 of FIG. 7.

Next, a behavior of the test solution in a case where the test solution is dropped into the inspection cartridge 1 will be described with reference to a conceptual diagram of FIG. 9.

Figure 9:
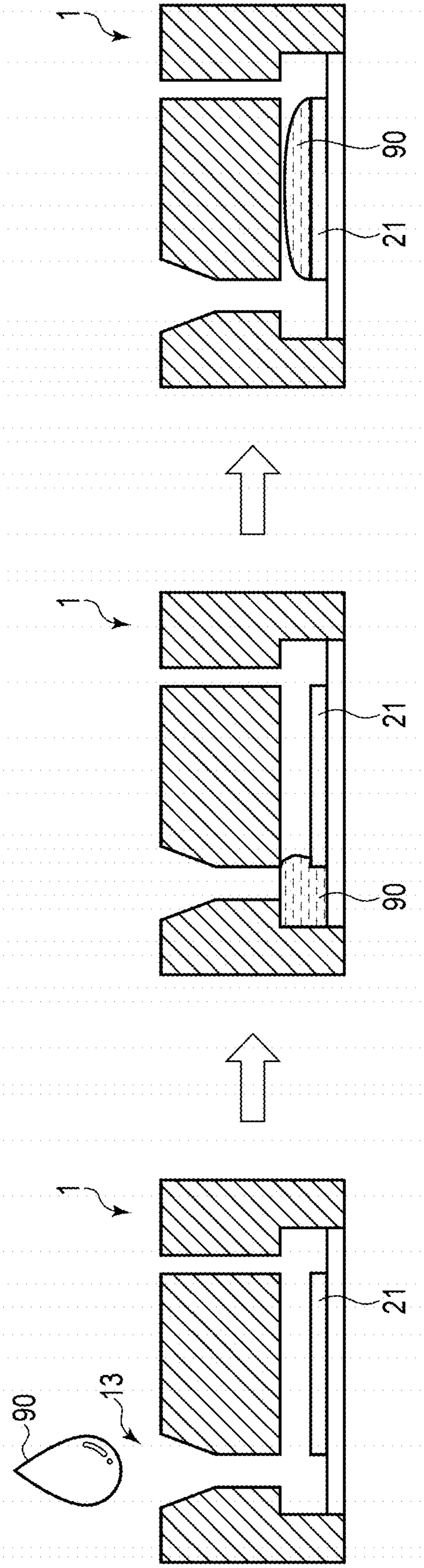
FIG. 9 is a conceptual diagram illustrating a behavior of a test solution when the test solution is dropped according to the first embodiment.

FIG. 9 is a cross-sectional view of FIG. 6, and a left diagram of FIG. 9 illustrates a state immediately after the test solution 90 is dropped to the drip opening 13 of the inspection cartridge 1 by a dropping device (not illustrated). Since the drip opening 13 has a tapered shape in which a diameter increases toward the upper surface, the inspector easily drops the test solution 90 reliably.

A central diagram of FIG. 9 illustrates a state in which the sample solution is temporarily stored in the reservoir 12 after the test solution 90 is dropped. Since the reservoir 12 has liquid-repellency, the liquid wets and spreads (is fed) to the reaction detection surface 21 having lyophilic property. At this time, since the first flow path and the second flow path are arranged symmetrically with respect to the reservoir 12, substantially the same amount of the test solution 90 flows into the first flow path and the second flow path.

A right diagram of FIG. 9 illustrates a state in which the test solution 90 is wet and spread on the reaction detection surface 21 and the reaction tank 15 is filled with the test solution 90. As illustrated in the right diagram of FIG. 9, since the test solution 90 temporarily stored in the reservoir 12 wets and spreads toward the reaction detection surface 21 having lyophilic property, the test solution 90 hardly remains in the reservoir 12, and the test solution 90 can be sent to each of the reaction detection surfaces 21 of the first flow path and the second flow path even if the test solution 90 is a trace amount such as 1 to 2 drops.

Next, a modification of the reservoir 12 will be described with reference to FIG. 10.

Figure 10:
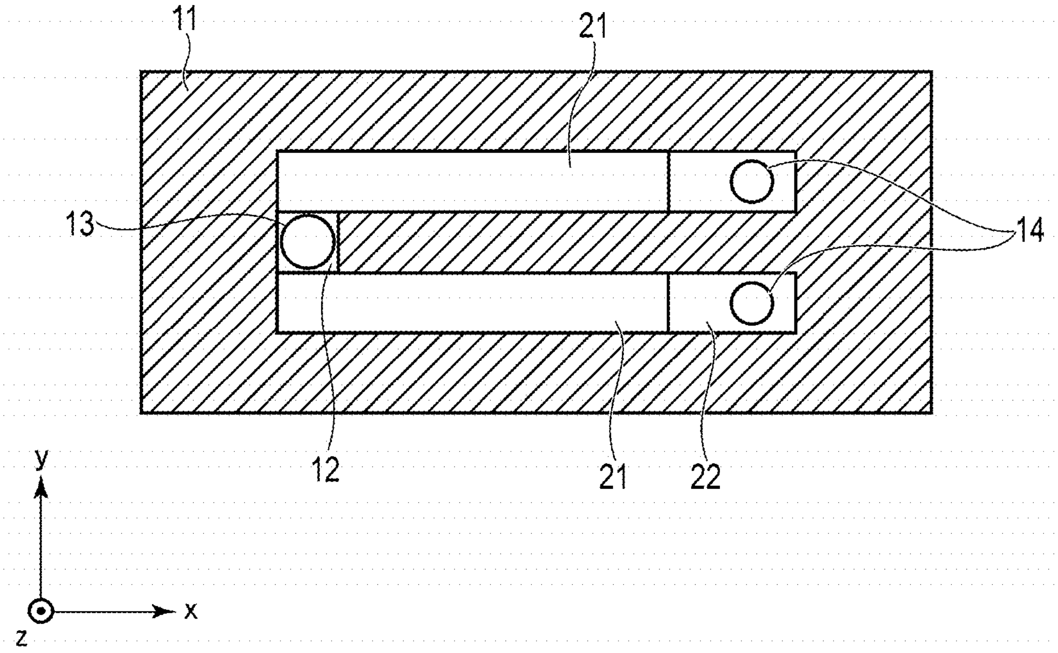
FIG. 10 is a diagram illustrating a modification of a reservoir according to the first embodiment.

FIG. 10 is a cross-sectional view of the inspection cartridge 1 similar to FIG. 5. FIG. 10 shows an example in which an area of the reservoir 12 is designed between the first flow path and the second flow path and on an end side. Furthermore, the drip opening 13 is formed such that the reservoir 12 is positioned downward in accordance with the size and position of the reservoir 12.

The reservoir 12 is formed so as to reduce the volume in this manner, so that the test solution easily flows from the reservoir 12 to each flow path having the reaction detection surface 21.

In the above example, it is assumed that two flow paths having two rows of reaction detection surfaces 21 are formed, but one flow path having one row of reaction detection surfaces 21 may be formed, or three or more flow paths may be formed. In this case, the antibody applied to the reaction detection surface 21 may be different or the same for each row. In particular, in a case where three or more rows of the reaction detection surfaces 21 are formed, at least two rows may be the same antibody.

Next, as an example of three or more flow paths, a configuration example of the inspection cartridge 1 in a case where there are three flow paths will be described with reference to FIG. 11.

Figure 11:
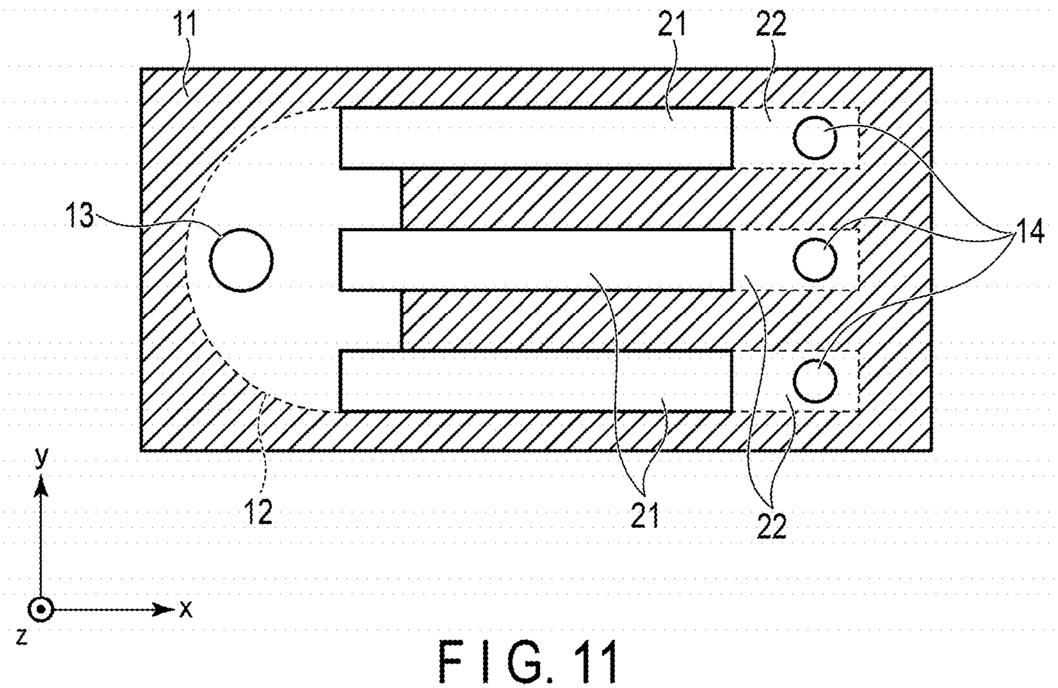
FIG. 11 is a diagram illustrating a configuration example of the inspection cartridge in a case where there are three flow paths according to the first embodiment.

FIG. 11 is a diagram similar to FIG. 5, but shows a case where there are three rows of reaction detection surfaces 21. Even in a case where there are three rows of flow paths including the reaction detection surfaces 21 as described above, since the flow paths are arranged symmetrically with respect to the drip opening 13, it is possible to feed substantially the same amount of the test solution in the reservoir 12 to the flow paths including the respective reaction sensing units.

Next, a modification of the reservoir 12 in a case where there are three flow paths will be described with reference to FIG. 12.

Figure 12:
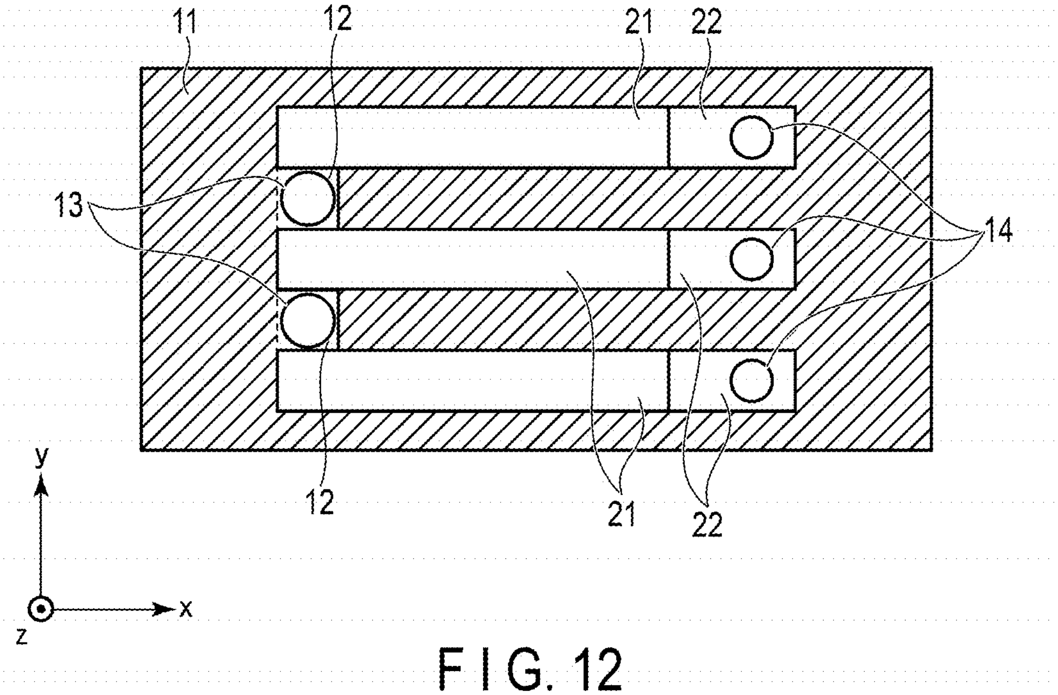
FIG. 12 is a diagram illustrating a modification of the reservoir in a case where there are three flow paths according to the first embodiment.

As shown in FIG. 12, the reservoir 12 is designed between the respective flow paths, and here, two reservoirs 12 are formed. Here, it is assumed that the drip openings 13 are arranged at two places and the liquid is dropped from each of the drip openings 13, but the present invention is not limited thereto. For example, one drop port 13 may be disposed on an upper surface of the housing 11, and may be branched into two in the housing 11 from the upper surface of the housing 11 to the reservoir 12, and the test solution may be sent to each of the two reservoirs 12.

Next, a first modification of the inspection cartridge 1 according to the first embodiment will be described with reference to FIG. 13.

Figure 13:
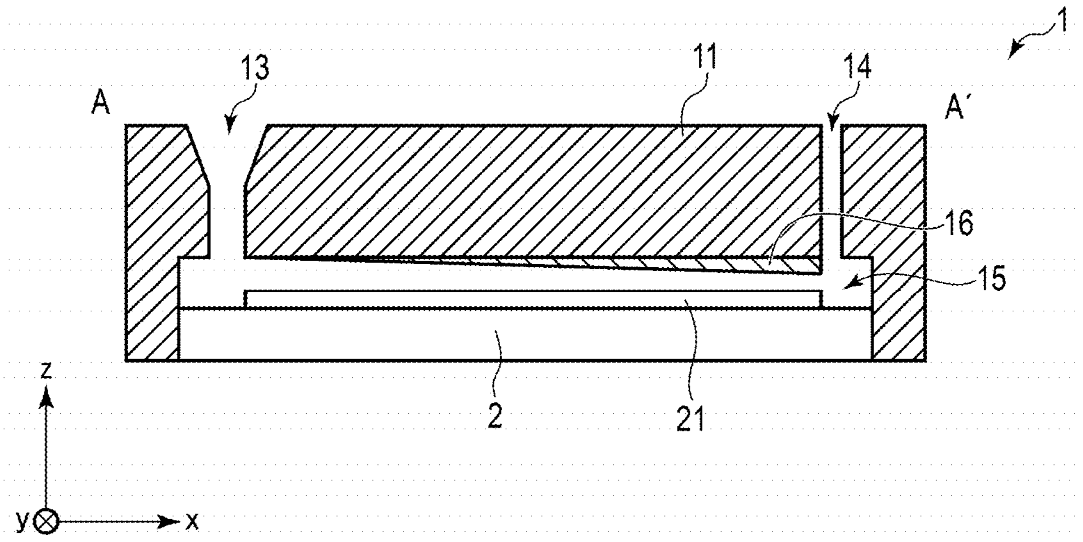
FIG. 13 is a diagram illustrating a first modification of the inspection cartridge according to the first embodiment.

FIG. 13 is a cross-sectional view similar to FIG. 6, but an auxiliary member 16 is disposed on an opposing surface of the reaction detection surface 21, in other words, on an upper surface side of the flow path including the reaction detection surface 21. In other words, the auxiliary member 16 is formed such that the flow path is narrowed toward a direction in which the test solution is delivered to the flow path from the reservoir 12 inclined downward toward an end opposite to an end where the reservoir 12 exists. The auxiliary member 16 may be integrally molded with the housing 11, or a material having liquid-repellency may be attached to the upper surface side.

According to the structure of FIG. 13, a volume of the flow path becomes small, and a capillary phenomenon also occurs depending on the size of a diameter of the flow path, so that the test solution more easily flows from the reservoir 12 to the flow path.

Next, a second modification of the inspection cartridge 1 according to the first embodiment will be described with reference to FIG. 13.

Figure 14:
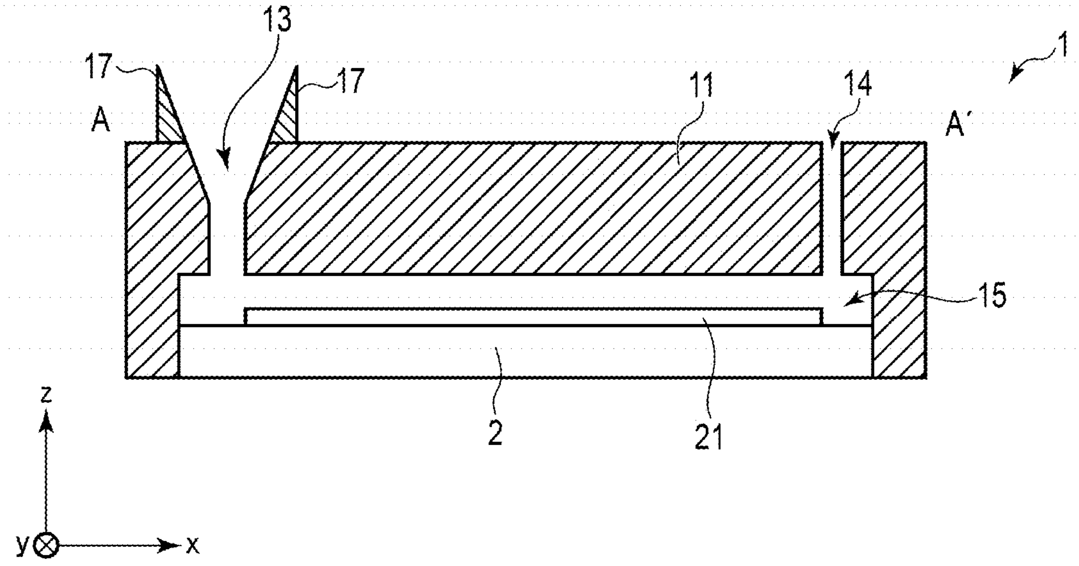
FIG. 14 is a diagram illustrating a second modification of the inspection cartridge according to the first embodiment.

FIG. 14 is a cross-sectional view similar to FIG. 6. In the second modification, a bank 17 may be formed around a surface of the housing 11 of the drip opening 13. With formation of the bank 17, the test solution is easily dropped into the drip opening 13, and the test solution is hardly overflowed from the reaction tank 15. The bank 17 may be integrally molded with the housing, or may be formed of another material having liquid-repellency.

Next, a third modification of the inspection cartridge 1 according to the first embodiment will be described with reference to FIG. 15.

Figure 15:
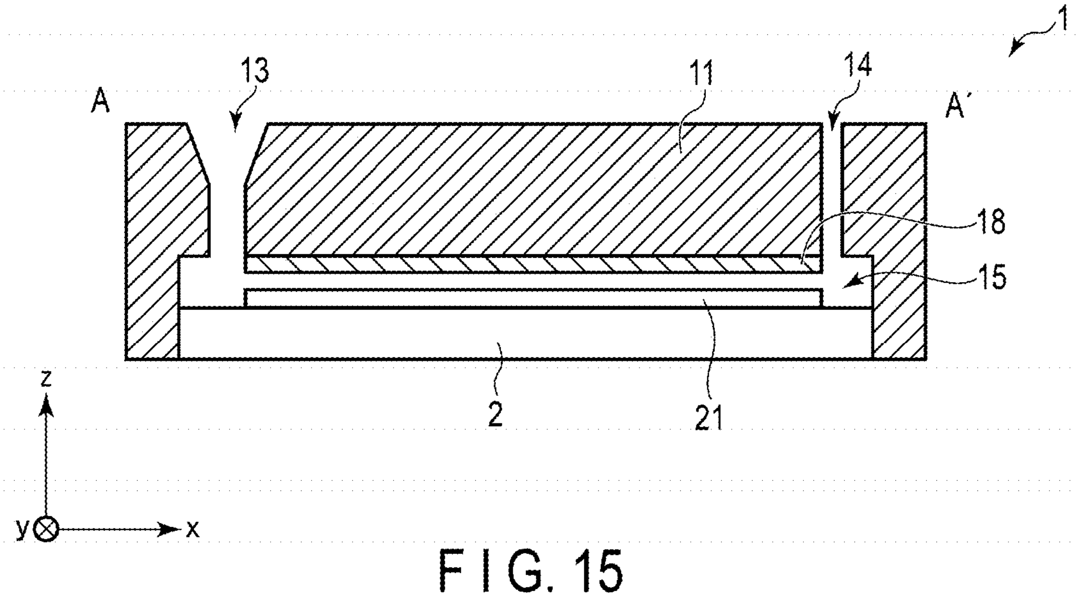
FIG. 15 is a diagram illustrating a third modification of the inspection cartridge according to the first embodiment.

In FIG. 15, a detection reagent 18 for detecting a detection target substance is applied, dried, and fixed to an opposing surface of the reaction detection surface 21, in other words, at least a partial area of a wall surface located on a flow path surface. In a case where the detection reagent 18 is fixed, an upper surface portion of the reaction tank 15 of the housing 11 may be formed with a concave structure in consideration of the thickness to be fixed.

In addition, the detection reagent 18 may be coated with a hydrophilic film or formed with a large number of fine convex structures so as to be uniformly applied and dried. The convex structure may be a rectangular parallelepiped, a cylinder, a cone or a pyramid, a hemispherical shape, or the like.

In a case where the detection reagent 18 is fixed, a sample solution containing a detection target substance is dropped instead of the test solution, so that the sample solution and the detection reagent 18 are mixed in the flow path and wet and spread on the reaction detection surface 21 as the test solution. Therefore, for example, it is not necessary to mix the detection target substance and the reagent before dropping of the inspection cartridge 1, the inspection processing can be simplified, and a burden on an inspector can also be reduced.

Note that the inspection cartridge according to the present embodiment described above can be applied not only to a relatively low-viscosity liquid such as a test solution including mucosal epithelium or blood but also to a highly viscous liquid such as sputum or nasal discharge.

According to the first embodiment described above, in the reaction tank of the inspection cartridge, the liquid-phobic reservoir exists below the drip opening for dropping the test solution, and the reservoir is connected to one or more flow paths having a reaction detection surface which has lyophilic property. As a result, the test solution dropped to the reservoir having liquid-repellency is likely to wet and spread on the reaction detection surface having lyophilic property. Furthermore, since the respective flow paths are arranged symmetrically with respect to the drip opening, even if the amount of the test solution is small, the test solution can be uniformly and quickly delivered to the reaction detection surface.

Second Embodiment

As in the first embodiment, in a case where the flow path is partitioned by the isolation wall and each flow path is independently formed, there is a possibility that the test solution is not uniformly delivered due to a deviation in delivery timing of the test solution to each flow path. In this case, air bubbles are generated in the flow path, or a reaction time of the test solution in each flow path is shifted, so that a correct result may not be obtained in some inspection results. Therefore, the second embodiment is different from the first embodiment in that a gap is provided in a portion where an isolation wall sandwiched between flow paths is formed in the first embodiment.

An inspection cartridge 1 according to a second embodiment will be described with reference to FIG. 16.

Figure 16:
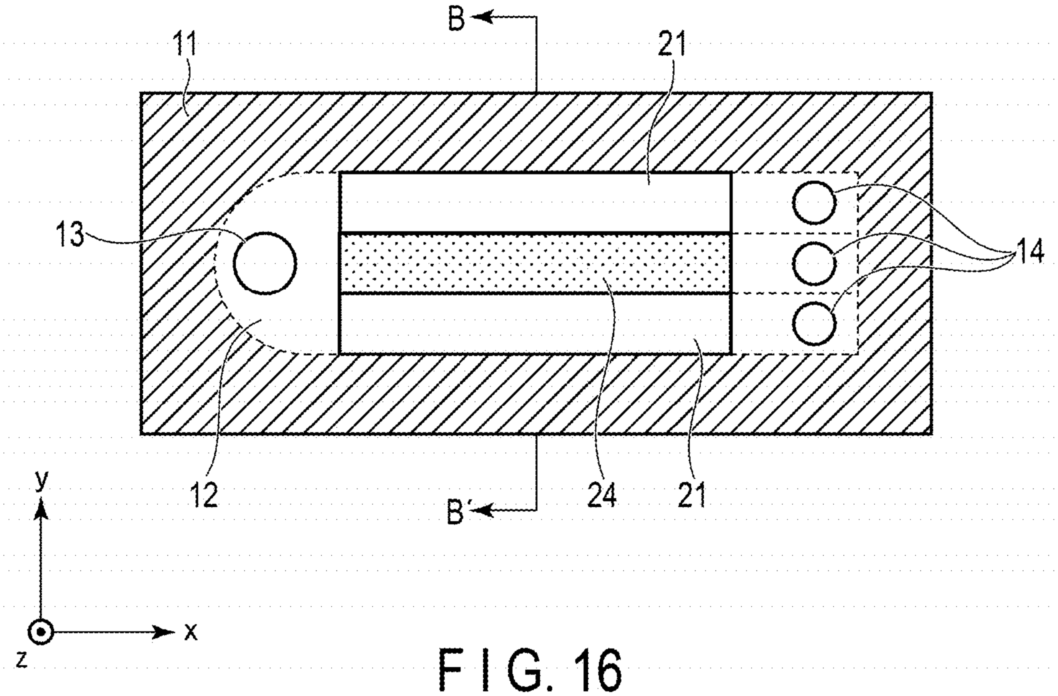
FIG. 16 is a diagram illustrating a configuration example of an inspection cartridge according to a second embodiment.

FIG. 16 is a view of a cross section of a reaction tank portion of the inspection cartridge 1 as viewed from a z-axis direction. Note that, as in the case of FIG. 5, each of a drip opening 13 and vents 14 is an opening provided in the housing 11, but opening positions thereof are illustrated in an overlapping manner.

A non-detection area 24 is formed between the two reaction detection surfaces 21 (also referred to as reaction detection areas). The non-detection area 24 has liquid-phobic properties similarly to the non-reaction detection surface 22 of the first embodiment. The non-detection area 24 is, for example, a part of the housing 11.

Further, the vents 14 which are air holes are formed not only with respect to the two reaction detection surfaces 21 but also with respect to the non-detection area 24 on the opposite side of the drip opening 13 on an extension line in an x-axis direction.

Figure 17:
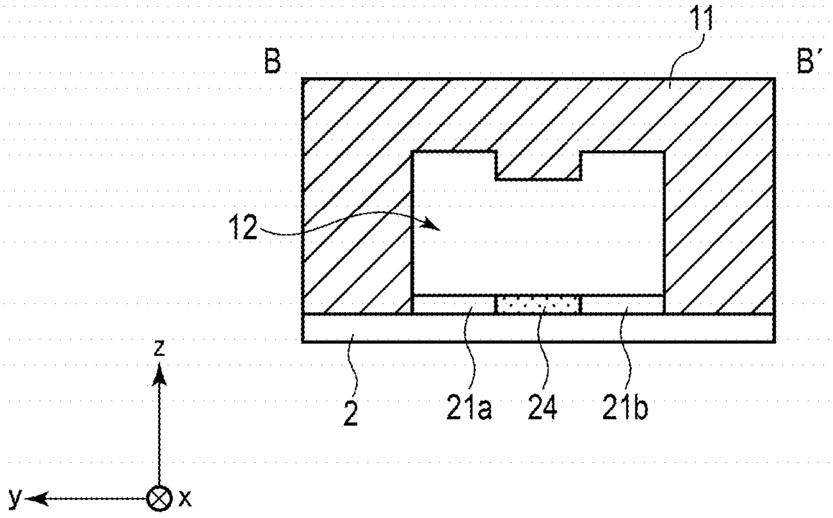
FIG. 17 is a cross-sectional view illustrating a configuration example of the inspection cartridge according to the second embodiment.

Subsequently, a cross-sectional view of the inspection cartridge 1 according to the second embodiment taken along a plane B-B' is illustrated in FIG. 17.

In FIG. 7, the area where the isolation wall 111 existed becomes a gap, and a flow path of the test solution is formed in the reaction tank 15 by the housing 11, the reaction detection surface 21*a*, the reaction detection surface 21*b*, and the non-detection area 24. Next, a first modification of the inspection cartridge 1 according to the second embodiment will be described with reference to FIG. 18.

Figure 18:
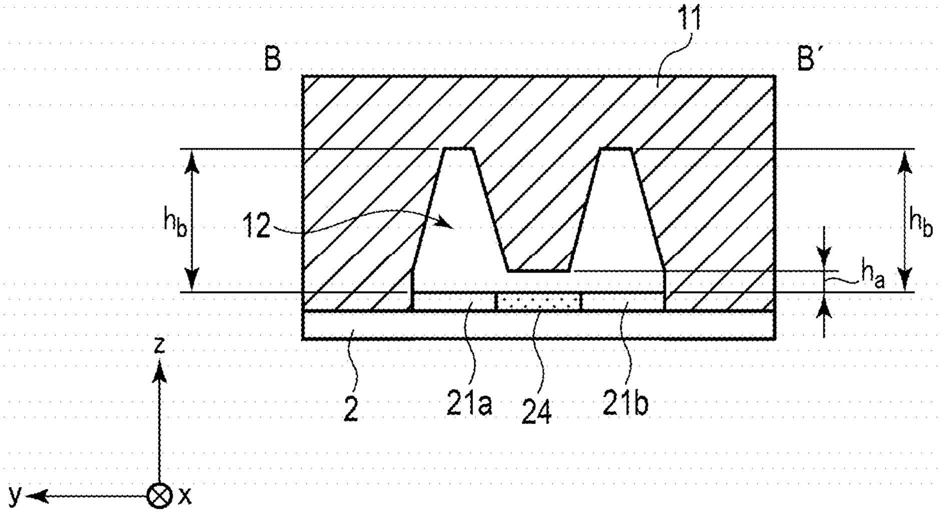
FIG. 18 is a cross-sectional view illustrating a first modification of the inspection cartridge according to the second embodiment.

FIG. 18 is a cross-sectional view taken along line B-B' of the inspection cartridge 1 similar to FIG. 17. A housing on a top surface side facing the reaction detection surface 21*a* and the reaction detection surface 21*b*, that is, on an upper surface side of the reaction tank 15 has tapered shapes. Specifically, a tapered shape is provided so as to spread from the upper surface of the reaction tank 15 toward the reaction detection surface 21*a*. Similarly, a tapered shape is provided so as to spread from the upper surface of the reaction tank 15 toward the reaction detection surface 21*b*.

Furthermore, a height ha of the gap from the non-detection area 24 to a wall surface of the housing 11, that is, an upper surface of the reaction tank 15 is lower than a height $h_b$ of each gap from the reaction detection surface 21*a* to the upper surface of the reaction tank 15 and from the reaction detection surface 21*b* to the upper surface of the reaction tank 15. Specifically, the height $h_b$ of the gap from the reaction detection surface 21*a* to the upper surface of the reaction tank 15 and from the reaction detection surface 21*b* to the upper surface of the reaction tank 15 is designed to be, for example, approximately 700 micrometers to approximately 1400 micrometers. On the other hand, the height ha of the gap from the non-detection area 24 to the upper surface of the reaction tank 15 is designed to be, for example, approximately 100 micrometers to approximately 200 micrometers. As a result, the test solution can be efficiently developed on the reaction detection surface.

Figure 19:
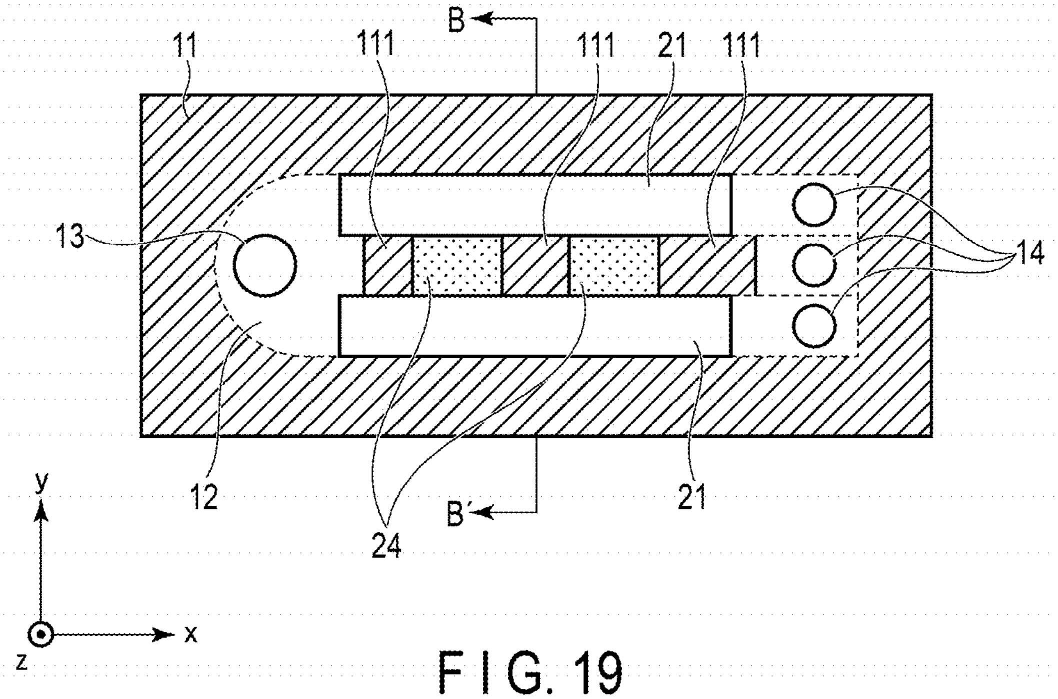
FIG. 19 is a cross-sectional view illustrating a second modification of the inspection cartridge according to the second embodiment.

Next, a second modification of the inspection cartridge 1 according to the second embodiment will be described with reference to FIG. 19.

In the second modification, isolation walls 111 are partially disposed on non-detection areas 24. In the example of FIG. 19, the isolation walls 111 and the non-detection areas 24 are intermittently formed. The size of the isolation walls 111 and intervals at which the isolation walls 111 are disposed may be appropriately designed in a mode in which bubbles are hardly formed according to the viscosity, the liquid amount, and the like of the test solution. As a result, it is possible to efficiently develop the test solution on the reaction detection surface while preventing the test solution from physically staying in the non-detection areas 24 by the isolation walls 111.

Note that, in FIGS. 16 to 19, the case where the number of detection reaction surfaces is two, that is, the number of flow paths is two has been taken as an example. However, even in a case where there are three or more flow paths, the detection reaction surfaces may be similarly formed in the gaps above the non-detection area sandwiched between the flow paths.

According to the second embodiment described above, the inspection cartridge has a gap above the non-detection area sandwiched between the reaction detection surfaces, in other words, the non-detection area sandwiched between the flow paths. An air port is also formed in the non-detection area. As a result, since the test solution dropped on the inspection cartridge is fed to the entire reaction tank, a shift in feeding timing to each flow path, such as feeding to only some flow paths, is less likely to occur. In addition, the air port is also formed in the non-detection area, so that the air in the reaction tank is appropriately discharged from the air port to the outside of the inspection cartridge, and therefore a risk of generating air bubbles in the reaction tank can be reduced. As a result, efficient inspection can be performed.

Note that the term "processor" used in the above description means, for example, a central processing unit (CPU), a graphics processing unit (GPU), or a circuit such as an application specific integrated circuit (Application Specific Integrated Circuit: ASIC) or a programmable logic device (for example, a simple programmable logic device (SPLD), a complex programmable logic device (CPLD), and a field programmable gate array (FPGA)). In the case where the processor is, for example, a CPU, the processor realizes a function by reading and executing a program stored in a storage circuit. On the other hand, in a case where the processor is, for example, an ASIC, the above function is directly incorporated as a logic circuit in a circuit of the processor instead of storing the program in the storage circuit. Note that each processor of the present embodiment is not limited to a case where each processor is configured as a single circuit, and a plurality of independent circuits may be combined and configured as one processor to realize the function. Furthermore, a plurality of components in the drawings may be integrated into one processor to implement the function. That is, efficient inspection can be performed.

Although some embodiments have been described, these embodiments have been presented as examples, and are not intended to limit the scope of the invention. These embodiments can be implemented in various other forms, and various omissions, substitutions, changes, and combinations of the embodiments can be made without departing from the gist of the invention. These embodiments and modifications thereof are included in the scope and gist of the invention and are included in the invention described in the claims and the equivalent scope thereof.

Regarding the above embodiments, the following supplementary notes are disclosed as one aspect and selective features of the invention.

(Supplementary Note 1)

An inspection cartridge, including:

a housing having an opening for dropping a test solution;

a first flow path including a first detection surface that is a lyophilic and has a substance that binds to the test solution on a surface;

a second flow path including a second detection surface that is lyophilic and has a substance that binds to the test solution on a surface, the second flow path being parallel to the first flow path; and a reservoir formed below the opening and connected to the first flow path and the second flow path, the reservoir being liquid-phobic.

(Supplementary Note 2)

The first flow path and the second flow path may be arranged symmetrically with respect to the opening.

(Supplementary Note 3)

the reservoir may be connected to end portions of the first flow path and the second flow path, and the first flow path, the second flow path, and the reservoir may be formed such that amounts of the test solution fed to the first flow path and the second flow path are substantially the same.

(Supplementary Note 4)

The reservoir may be arranged between the first flow path and the second flow path and on an end side each of the first flow path and the second flow path.

(Supplementary Note 5)

The inspection cartridge may further include an isolation wall arranged between the first flow path and the second flow path, the isolation wall may be liquid-phobic.

(Supplementary Note 6)

The inspection cartridge may further include a non-detection area formed between the first flow path and the second flow path and having a gap above the non-detection area.

(Supplementary Note 7)

The non-detection area may have liquid-phobic.

(Supplementary Note 8)

The housing may have one or more air ports corresponding to each of the first flow path, the second flow path, and the non-detection area.

(Supplementary Note 9)

A height of a gap from the non-detection area to an upper wall surface of the housing may be lower than a height of a gap from the first detection surface to an upper wall surface of the housing and a height of a gap from the second detection surface to an upper wall surface of the housing.

(Supplementary Note 10)

A height of gap from the first detection surface to an upper wall surface of the housing and a height of gap from the second detection surface to an upper wall surface of the housing may be approximately 700 micrometers to approximately 1400 micrometers, and a height of a gap from the non-detection area to an upper wall surface of the housing may be approximately 100 micrometers to approximately 200 micrometers.

(Supplementary Note 11)

A reagent containing a substance that binds to a detection target substance contained in the test solution may be dried and fixed to at least a part of a wall surface of the housing facing the first detection surface and the second detection surface.

(Supplementary Note 12)

A cartridge, including:

a housing having an opening for dropping a test solution and one or more air ports;

a first detection surface located in the housing and having a substance that binds to the test solution on a surface of the first detection surface;

a second detection surface located inside the housing and having the substance on a surface of the second detection surface, the second detection surface being parallel to the first detection surface; and a non-detection surface formed between the first detection surface and the second detection surface, in which an air gap is provided above the first detection surface, the second detection surface, and the non-detection surface.

What is claimed is:

1. An inspection cartridge, comprising:

a housing having an opening for dropping a test solution;

a first flow path including a first detection surface that is a lyophilic and has a substance that binds to the test solution on a surface;

a second flow path including a second detection surface that is lyophilic and has a substance that binds to the test solution on a surface, the second flow path being parallel to the first flow path; and a reservoir formed below the opening and connected to the first flow path and the second flow path, the reservoir being liquid-phobic.

2. The inspection cartridge according to claim 1, wherein the first flow path and the second flow path are arranged symmetrically with respect to the opening.

3. The inspection cartridge according to claim 1, wherein the reservoir is connected to end portions of the first flow path and the second flow path, and the first flow path, the second flow path, and the reservoir are formed such that amounts of the test solution fed to the first flow path and the second flow path are substantially the same.

4. The inspection cartridge according to claim 1, wherein the reservoir is arranged between the first flow path and the second flow path and on an end side each of the first flow path and the second flow path.

5. The inspection cartridge according to claim 1, further comprising an isolation wall arranged between the first flow path and the second flow path, the isolation wall being liquid-phobic.

6. The inspection cartridge according to claim 1, further comprising a non-detection area formed between the first flow path and the second flow path and having a gap above the non-detection area.

7. The inspection cartridge according to claim 6, wherein the non-detection area has liquid-phobic.

8. The inspection cartridge according to claim 6, wherein the housing has one or more air ports corresponding to each of the first flow path, the second flow path, and the non-detection area.

9. The inspection cartridge according to claim 6, wherein a height of a gap from the non-detection area to an upper wall surface of the housing is lower than a height of a gap from the first detection surface to an upper wall surface of the housing and a height of a gap from the second detection surface to an upper wall surface of the housing.

10. The inspection cartridge according to claim 6, wherein a height of gap from the first detection surface to an upper wall surface of the housing and a height of gap from the second detection surface to an upper wall surface of the housing are approximately 700 micrometers to approximately 1400 micrometers, and a height of a gap from the non-detection area to an upper wall surface of the housing is approximately 100 micrometers to approximately 200 micrometers.

11. The inspection cartridge according to claim 1, wherein a reagent containing a substance that binds to a detection target substance contained in the test solution is dried and fixed to at least a part of a wall surface of the housing facing the first detection surface and the second detection surface.

12. An inspection cartridge, comprising:

a housing having an opening for dropping a test solution and one or more air ports;

a first detection surface located in the housing and having a substance that binds to the test solution on a surface of the first detection surface;

a second detection surface located inside the housing and having the substance on a surface of the second detection surface, the second detection surface being parallel to the first detection surface; and a non-detection surface formed between the first detection surface and the second detection surface, wherein an air gap is provided above the first detection surface, the second detection surface, and the non-detection surface.

* * * * *